June 19, 1962 J. B. WIENER 3,039,603

CARD PROCESSING SYSTEM

Filed Dec. 16, 1957 3 Sheets-Sheet 1

INVENTOR
Jerome B. Wiener
By Smyth & Roston
Attorneys

INVENTOR:
Jerome B. Wiener
By Smyth & Roston
Attorneys

June 19, 1962 J. B. WIENER 3,039,603

CARD PROCESSING SYSTEM

Filed Dec. 16, 1957 3 Sheets-Sheet 3

INVENTOR:
Jerome B. Wiener

By Smyth & Roston

Attorneys.

3,039,603
CARD PROCESSING SYSTEM

Jerome B. Wiener, Granada Hills, Calif., assignor to Magnavox Company, Los Angeles, Calif., a corporation of Delaware Filed Dec. 16, 1957, Ser. No. 703,080
20 Claims. (Cl. 209—72)

The present invention relates to a system for processing information storage cards, and it is more particularly concerned with an improved system and apparatus for arranging cards from several input stacks into a sorted condition in one or more output stacks.

The system of the invention finds general application in conjunction with information storage cards on which data is recorded in digital form at a plurality of separate positions on each card. The need often arises in data processing to merge several stacks of such cards into a single stack. The cards in the individual stacks may have been previously sorted as to the data recorded at a particular position on each card so that such data is represented in a logical sequence or progression from one card to the next. The system and apparatus of the present invention is capable of rapidly merging the individually sorted cards in the several stacks into a single stack in which the cards are established in a desired logical sequence with respect to the information at the particular position. This, for example, may be an ascending sequence or a descending sequence, an alpha-numeric sequence, etc.

Alternatively, the system of the invention is well suited as a collating system in which the cards from a plurality of input stations are compared and sorted with respect to the recorded data at a selected position on each card. In a typical collating process, for example, certain cards are selected from a first input station and deposited in order with the cards from a second input station in one output stack, the remaining cards from the first input station being deposited in a second output stack.

The use of data processing systems has increased materially in recent years. One known type of system uses a plurality of information storage cards of rectangular shape. The data stored in the system is recorded on the individual cards in the form of patterns of holes or magnetized dots, the magnetized dots having one polarity or another. The holes or magnetized dots are arranged in rows and columns on the various cards, and the data is recorded in accordance with the arrangement of the dots or holes in each of the particular columns.

Each such transverse column is considered to be a different "position" on each of the several cards, and each card is processed from one position to the next. When such recording is used, the data at each position is preferably in binary form. In this manner, a binary number is represented at each such position. This binary number, in turn, may represent other information in coded form, as is well known. Many of the more complex data processing systems require many hundreds of thousands of information storage cards ofth is general type.

As noted above, the need often arises in data processing systems to merge the cards of several individual stacks into a single stack, with the binary data at a particulr position on the cards originally being represented in a logical sequence or progression in each of the individual stacks and finally being so represented in the merged stack.

For example, successive cards of a first stack may have binary data recorded on them at a certain position in a progression such as 3, 9, 15, 19, 22, and so on. Successive cards of a second stack may have binary data recorded at the same position on successive cards in a progression such as 1, 2, 3, 7, 11, 19, and so on. The apparatus and system of the invention is capable of rapidly merging the cards from the individual stacks into a single stack in which the progression at the particular position for successive cards in the single merged stack is 1, 2, 3, 3, 7, 9, 11, 15, 19, 19, 22 and so on A feature of the system and apparatus of the invention is its ability to rapidly and efficiently perform the merging operation described above and similar operations. Moreover, the apparatus and system of the invention achieves this end with relatively few components and by means of inherently simple mechanisms and control circuitry.

The system and apparatus of the invention utilizes a plurality of controllable holding stations of the type described in commonly assigned copending application Ser. No. 638,033, filed February 4, 1957, now Patent No. 2,936,169, in the name of Alfred M. Nelson et al. These holding stations are controlled so that a first one holds a card that was released from a first input station while cards are being sequentially released from a second input station. This release of cards from the second input station continues until the progression of the binary data at the selected position on each card equals or exceeds the data on the card being held by the first holding station. When this condition occurs, the release of cards from the second input station is immediately interrupted, and the last card out of the second input station is held by a second holding station. Then the held card in the first holding station is released, and a second card is released from the first input station and compared with the card held by the second holding station. The process continues, with cards being released from the first and second holding stations in such a manner that the logical sequence of the binary data at the selected position is obtained.

In the manner described, the cards from the two independent input stations can be merged or otherwise collated on an essentially continuous basis. This greatly speeds up the process, and such speeding up is important especially in the larger systems where many hundreds of thousands of information storage cards may be involved.

In the drawings:

FIGURE 1 is a top plan view of one embodiment of the system and apparatus of the present invention, this view illustrating in schematic form a plurality of rotatable vacuum pressure transporting drums which are arranged to transport cards from a pair of individual input stations to a common output station, the apparatus also including separate holding stations which are controllable so that the cards released to the common receiving station may represent binary data in a desired sequence from one card to the next;

Figure 1:
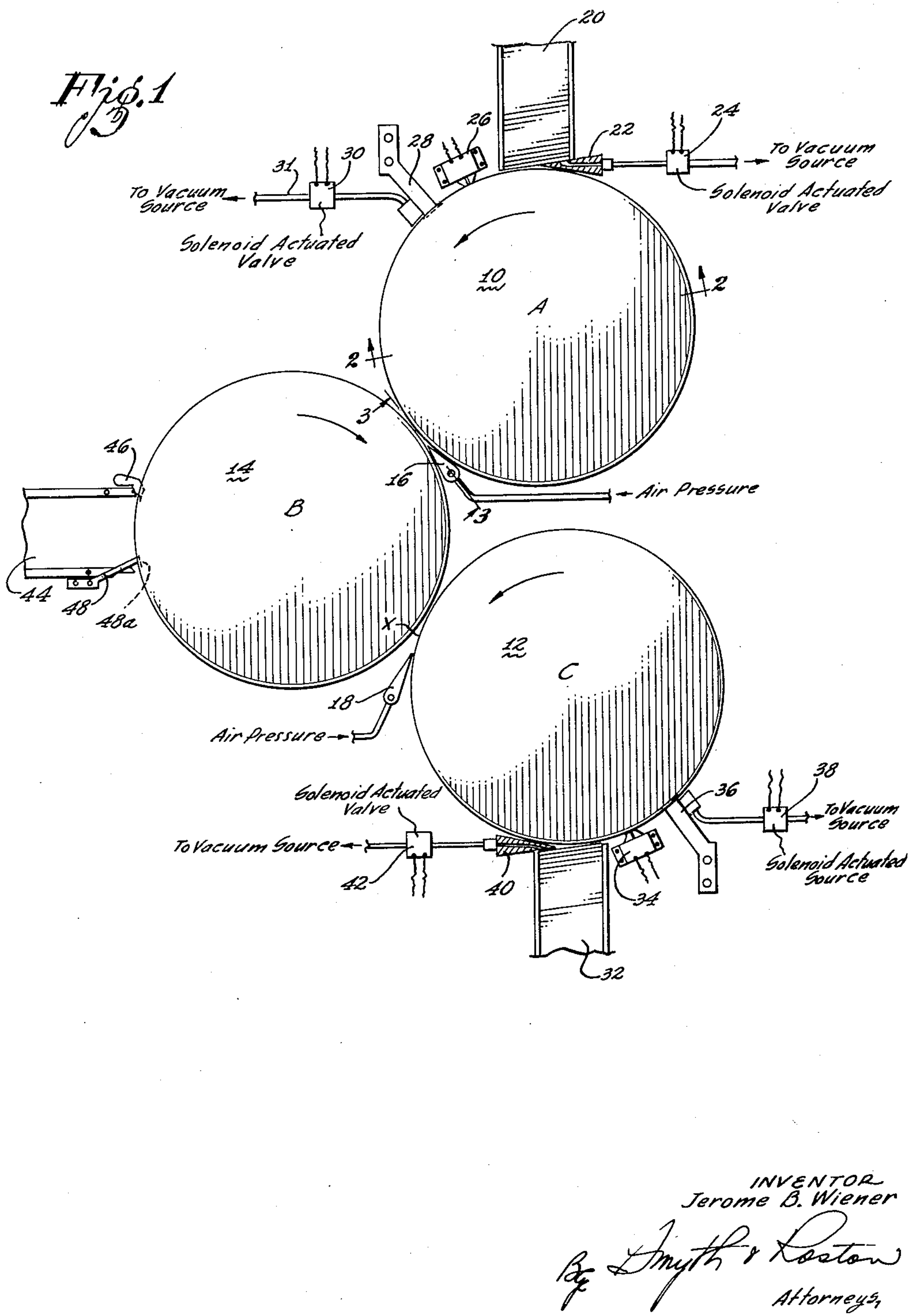
Figure 4:
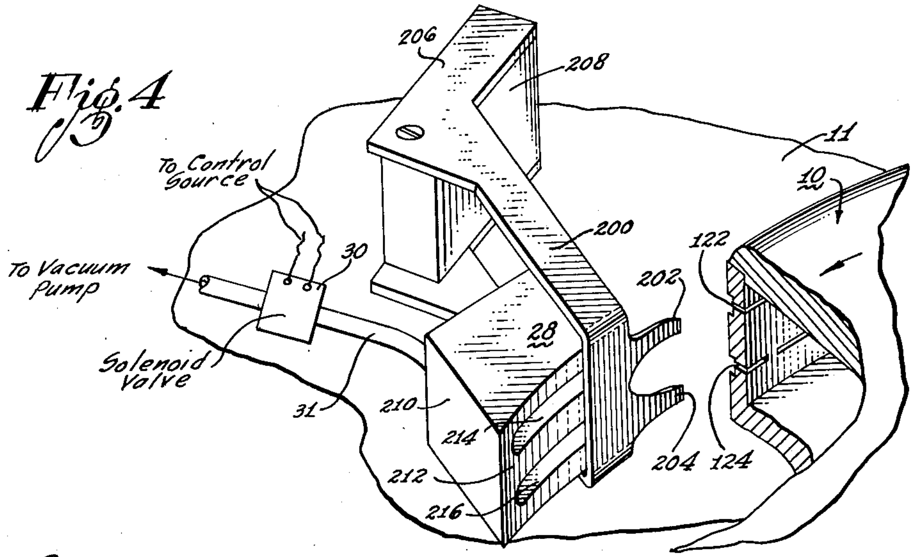
Figure 5:
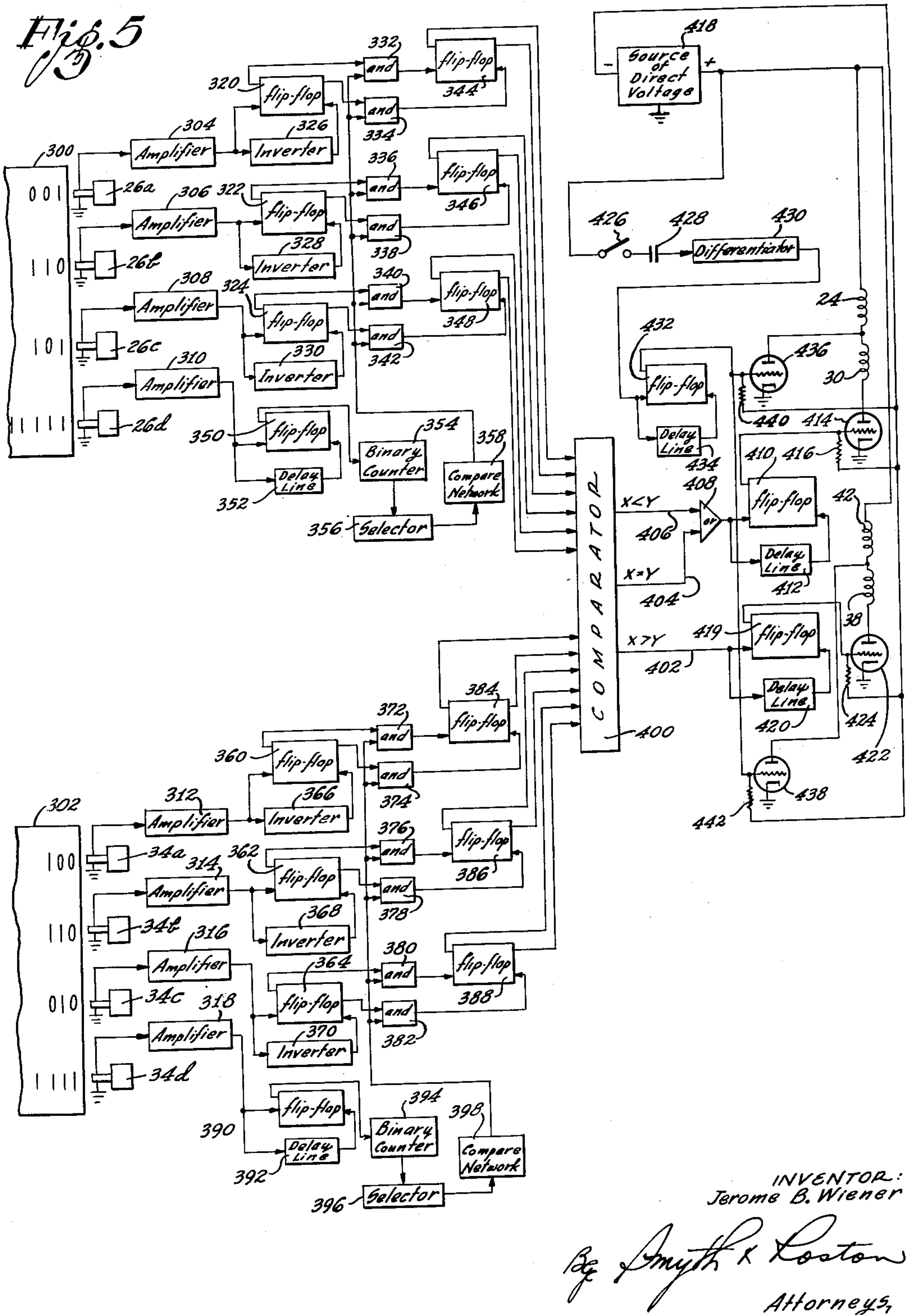

FIGURE 4 is a perspective view partly in section of one of the holding stations for arresting the cards on the periphery of the vacuum pressure transporting drum with which that particular holding station is associated, the holding station being controllable so that the card held by it may be selectively released; and FIGURE 5 is a block representation of an electronic control system suitable for controlling the apparatus and system of FIGURE 1, so as to enable that apparatus properly to perform its card merging function.

The apparatus of FIGURE 1 includes suitable transport means such as a rotatable vacuum pressure transporting drum 10. As will become more apparent subsequently, the transport means may be movable or may be stationary but should be constructed to provide a movement of cards and a transfer of cards from one transport means to the other. The drum 10 may be rotatably mounted on a suitable horizontal table top 11, and the drum is considered as being rotatable in a counterclockwise direction. A second horizontal rotatable vacuum pressure transporting drum 12 may also be rotatably mounted on the table top 11 in uniplanar relationship with the drum 10. Likewise, a third or common rotatable vacuum pressure transporting drum 14 is mounted on the table top 11 to be adjacent to both the drums 10 and 12 and in uniplanar relation with those drums. The drum 12 is rotatable in a counterclockwise direction, and the drum 14 is rotatable in a clockwise direction.

A first gate transfer mechanism 16 is mounted on the table top 11, and this gate transfer mechanism is disposed between the drums 10 and 14 adjacent the contiguous point of these two drums. The gate transfer mechanism 16 may be similar to the one described in commonly assigned copending application Ser. No. 562,154, filed January 30, 1956 in the names of Stuart L. Peck et al. Its constructional details will be described in conjunction with FIGURE 3. Briefly, it should be pointed out that the gate transfer mechanism 16 is constructed to emit streams of air in a tangential direction relative to the periphery of the drum 10. These streams of air cause a card transported on the periphery of the drum 10 and coming under their influence to be stripped from the drum 10 and transferred to the peripheral surface of the drum 14.

A similar gate transfer mechanism 18 is mounted on the table top 11, and this latter gate transfer mechanism is positioned to direct streams of air in a tangential direction relative to the periphery of the drum 12. In the same manner as the streams from the gate 16, the streams of air from the gate 18 effectuate the transfer of cards coming under their influence from the drum 12 to the drum 14. Both the gate transfer mechanisms 16 and 18 are continuously activated when the apparatus is in operation.

A first input station 20 is positioned on the table top 11 with its mouth adjacent the periphery of the drum 10. This input station is constructed to hold the information cards in stacked condition with the lower edges of the cards resting on the table top 11. A resiliently actuated means is included in the station to bias the stacked cards toward the mouth of the station so that the face of the leading card is pressed against the peripheral surface of the drum 10.

The leading wall of the station 20 has its end spaced a predetermined distance from the periphery of the drum 10. Sufficient space is left between the end of the wall and the periphery of the drum so that only one card at a time is released from the station to the periphery of the drum.

In a manner to be described, a vacuum pressure is established at the periphery of the drum 10. This vacuum pressure tends to withdraw the leading card from the station 20 so that the leading card may be transported on the periphery of the drum. The release of the leading card from the station is opposed by a vaccum pressure feed head 22. This feed head may be constructed in a manner similar to that described and claimed in commonly assigned copending application Ser. No. 552,506, filed December 12, 1955, now Patent No. 2,927,791, in the name of Hans Stern.

The feed head 22 is mounted adjacent the leading wall of the station 20, and it extends partially across the mouth of the station to engage the face of the leading card in the station. A vacuum pressure is established at the feed head 22 which is sufficient to overcome the tendency of the drum 10 to withdraw the leading card from the input station 20. However, a solenoid actuated valve 24 is interposed in the line coupling the feed head 22 to a suitable vacuum pressure source. The solenoid valve 24 is controlled in a manner to be described so that the vacuum pressure exerted by the head 22 on the leading card in the station 20 may be controllably interrupted. Whenever the vacuum pressure is so interrupted, the leading card is released from the station 20 to the periphery of the drum 10. The solenoid valve 24 is normally open, and when it is energized, it closes to interrupt the vacuum pressure at the input station.

A series of transducer heads, represented by the transducer means 26 in FIGURE 1, are mounted on the table top 11 and positioned adjacent the trailing wall of the station 20 with respect to the rotation of the drum 10. The heads 26 are placed as close to the trailing wall as possible and, in fact, these heads may be mounted directly on the trailing wall. The purpose of the heads 26 is to process each card released from the input station 20 immediately upon the release of the card.

A card holding station 28 is also mounted on the table top 11, and the card holding station is positioned adjacent the periphery of the drum 10. The details of the card holding station will be described in conjunction with FIGURE 4. Both the card holding station 28 and the transducer means 26 are spaced radially from the periphery of the drum 10 a distance sufficient to permit the cards transported on the periphery of the drum to pass these elements without interference.

A vacuum pressure is supplied to the card holding station 28 from a suitable vacuum pressure source and through a feed line 31 which includes a solenoid valve 30. Whenever the solenoid valve is not energized, it is open and the resulting vacuum pressure at the holding station 28 arrests any card transported on the periphery of the drum 10 and coming under the influence of the holding station. However, when the solenoid valve 30 is energized, the vacuum pressure at the holding station is interrupted so that the held card is released.

The holding station 28 may be preferably displaced from the leading wall of the station 20 in the direction of rotation of the drum 10 by a distance corresponding to the length of the individual information cards stored in the input station 20 or slightly less than this length. If the time for processing the card is not of extreme importance, the distance between the leading wall of the input station 20 and the holding station 28 may also be greater than the length of a card. Such positioning of the card holding station and of the transducer means 26 is preferred because the reading of a card emerging from the input station 20 by the transducer means 26 determines whether or not that card is to be held by the card holding station 28. If the card is not to be held by the card holding station, the next card released from the input station 20 can follow directly the first card with a minimum of lost space on the periphery of the drum 10. Likewise, the described positioning of the card holding station 28 permits the next card from the input station 20, following the release of a card from the card holding station 28, to follow directly after the released card without loss of space on the periphery of the drum 10.

An input station 32 similar to the input station 20, is positioned on the table top 11 with its mouth adjacent the periphery of the drum 12. A series of transducer heads, which are represented by the transducer means 34 in FIGURE 1, are positioned directly adjacent the trailing wall of the input station 32. A card holding station 36 is positioned on the table top 11, and this card holding station may be preferably displaced from the trailing wall of the station 32 by a distance corresponding to the length of an individual information card or by a distance slightly greater than this length. The holding station 36 may be constructed in a manner similar to the station 28. A solenoid-actuated valve 38 is interposed in the line coupling the holding station 36 to a suitable vacuum pressure source (not shown).

A controllable vacuum pressure feed head 40, which may be similar in its construction to the feed head 22, is mounted on the table top 11. The feed head 40 extends through the leading wall of the input station 32 partially across the mouth of the station. In a manner similar to the operation of the feed head 22, the feed head 40 controls the release of cards from the station 32. A solenoid-actuated valve 42 is mounted in the line coupling the feed head 40 to a suitable vacuum pressure source.

A receiving station 44 is mounted on the table top 11 with its mouth adjacent the periphery of the drum 14. This receiving station may be similar to the stacking station disclosed and claimed in copending application Ser. No. 571,088 filed March 12, 1956, in the name of Minoru T. Endo. The receiving station includes a stack head 46 which is disposed adjacent the trailing wall of the station. A pick-off member 48 is mounted adjacent the leading wall of the station 44. The pick-off member has a series of bulged fingers **48*a* which extend into peripheral grooves in the drum 14. The stack head 46** also has fingers that extend into these peripheral grooves.

Any card transported on the periphery of the drum 14 is brought by the drum to the mouth of the receiving station 44. Such a card rides up over the fingers **48*a*, and it is arrested at the mouth of the station 44 by the stack head 46. The trailing part of the arrested card projects over the fingers 48*a*. The next succeeding card transported on the periphery of the drum 14 is brought by the drum over the fingers 48*a* and under the preceding card. The subsequent card is also arrested by the stack head 46 and it serves to deposit the former card in the receiving station 44. In this manner, all the cards transported on the periphery of the drum 14 are deposited in sequence in the receiving station 44**.

In a manner to be described, the two stacks of cards to be merged are placed respectively in the input stations 20 and 32. It will be understood that these cards are to be merged into the receiving station 44 and that the single stack of cards in the receiving station is to be so arranged that the cards in the station 44 exhibit a logical sequence or progression of binary data at a selected position on the successive cards in the station. It will also be understood that the cards in the individual input stations 20 and 32 have been previously sorted so as to individually exhibit a logical sequence of binary data in each stack at the selected position of the several cards. In describing the operation of the system, the binary data in the progression will be assumed to be ascending from one card to the next.

After the stacks of cards have been placed in the stations 20 and 32, the feed heads 22 and 40 are both momentarily de-activated so that one card is released from each station. The released cards are read by the transducer means 26 and 34, and the holding stations 28 and 36 are selectively controlled (as will be described) so that one or the other of the cards is released and the other is held. If the released card is on the drum 12, it is transferred by the gate 18 to the drum 14. Alternately, if the released card is on the drum 10, it is so transferred by the gate 16. The transferred card is then carried to the receiving station 44 to be deposited in that station.

Whenever a card is released from the holding station 28 or from the holding station 36, a new card is released from the corresponding input station 20 or 32. For the merging process, each card from the input station 20, for example, is held at the holding station 28, and cards from the input station 32 are sequentially released and deposited in the proper sequence in the receiving station 44. This continues until the ascending progression of binary data on successive cards from the input station 32 equals or exceeds the binary data on the held card at the holding station 28.

When the progression does equal or exceed the data on the card held by the holding station 28, the release of cards from the holding station 36 and from the input station 32 is immediately stopped, and the cards are immediately released from the holding station 28 and thereafter in sequence from the input station 20 until the binary data at the selected position on the card held by the holding station 36 again drops below the data on the cards released from the input station 20. When this occurs, the release of cards from the holding station 28 is immediately stopped, and immediately the holding station 36 and thereafter the input station 32 begin sequentially to release cards. In this manner, the cards fed to the receiving station 44 are so fed in an ascending progression of binary data at the selected position. At the termination of the process, the two individual stacks of cards from the input stations 20 and 32 are received in merged form in the receiving station 44.

Figures 2, 3:
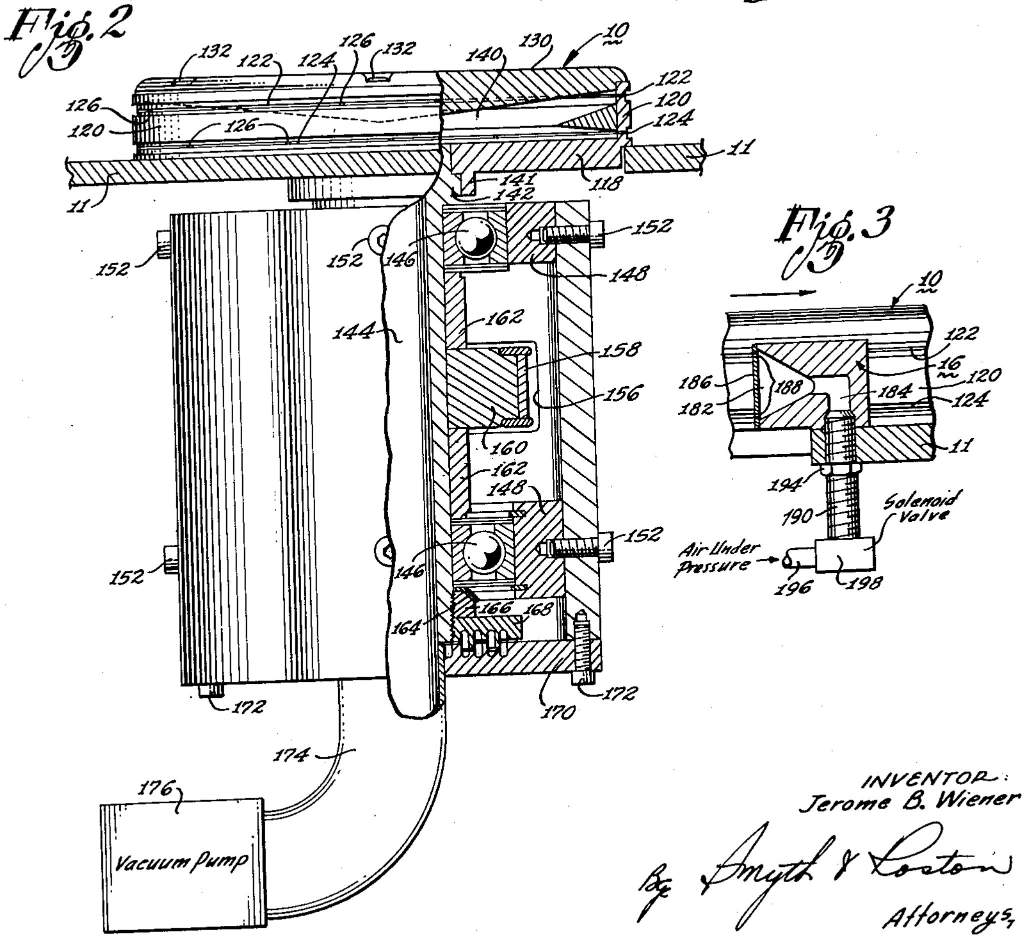
FIGURE 2 is a sectional view substantially on the line 2—2 of FIGURE 1 showing the constructional details of one of the vacuum pressure transporting drums utilized in the system and apparatus of FIGURE 1.
FIGURE 3 is a sectional view substantially on the line 3—3 of FIGURE 1 to show the constructional details of a gate mechanism that is used to transfer the cards from one vacuum pressure transporting drum to another as such cards are released by the holding stations to be transported to the common receiving station.

Each of the vacuum pressure transporting drums 10, 12 and 14 may be constructed in a manner similar to the vacuum pressure transporting drum described in commonly assigned copending application Ser. No. 600,975 which was filed July 30, 1956, now Patent No. 2,883,189, in the name of Loren R. Wilson. Only the details of the drum 10 are described in FIGURE 2 because the other drums may be similarly constructed. The drum shown in FIGURE 2 is similar to the drum disclosed and claimed in the copending Wilson application referred to above.

The drum 10 is made up of a lower section and of an upper section. The lower section of the drum includes a disk-like bottom portion 118 and an annular side portion 120 integral with one another. A pair of axially spaced peripheral orifices 122 and 124 extend through the side portion 120. Each of these orifices has a corresponding peripheral slot which was referred to previously in conjunction with the drum 14 and into which the fingers **48*a* and those associated with the stack head 46 extend. Each of the peripheral orifices is discontinuous in that it is interrupted at selected intervals about its periphery by ribs 126 integral with the side portion 120**.

The upper section of the drum 10 is in the form of a disk-like member 130 which engages the annular side member 120 of the lower section. The upper section 130 forms an enclosure with the lower section of the drum, with the upper section being parallel to the bottom portion 118 of the lower section. The upper section 130 is held in place on the side portion 120 by a series of screws 132.

A deflector ring 140 is supported within the interior of the drum 10 in press-fit with the inner surface of the annular side portion 120. This deflector ring is tapered toward the center of the drum to prevent turbulence and to provide a streamlined path for air that is drawn in through the orifices 122 and 124.

The portion 118 of the lower section of the drum 10 contains a central opening surrounded by an annular collar 141. The collar 141 surrounds a collar 142 provided at one end of a hollow shaft 144. The drum 10 is supported on a shoulder formed by the collar 142, and the end of the shaft 144 extends into the opening of the portion 118 in friction-fit with that portion. Therefore, rotation of the hollow shaft 144 causes the drum 10 to rotate. Also, the shaft 144 communicates with the interior of the drum. Bearings 146 are provided at opposite ends of the shaft 144. The inner races of the bearings 146 are mounted on the shaft 144, and the outer races of the bearings are disposed against bushings 148 secured to a housing 150 by a plurality of studs 152.

An arcuate opening 156 is provided in the housing 150 between the bearings 146. This opening enables a drive belt 158 to extend into the housing and around a pulley 160. The pulley 160 is keyed to the shaft 144 between the bearings 146, and it is held against axial movement on the shaft by a pair of sleeves 162. In this way, the shaft 144 and the drum 10 can be rotated by a suitable motor (not shown) coupled to the pulley 160 by the drive belt 158.

The bearings 146 and the sleeves 162 are held on the shaft 144 by a nut 166. The nut 166 is screwed on a threaded portion at the bottom of the shaft and a lock washer 164 is interposed between it and the lower bearing. A sealing disk 168 is also screwed on the threaded portion at the bottom of the shaft 144. The sealing disk 168 operates in conjunction with a bottom plate 170 to resist the movement of air between the interior of the housing 150 and the interior of the hollow shaft 144 when a difference of pressure exists between the housing and the shaft. The bottom plate 170 is secured to the housing 150 by a plurality of studs 172. The bottom plate has a central opening, and a hollow conduit 174 extends into that opening in friction-fit with the plate 170. The conduit 174 is axially aligned with the hollow shaft 144 so that air may be exhausted from the hollow interiors of the shaft and of the conduit by a vacuum pump 176. The vacuum pump may be of any suitable known construction and, for that reason, is shown merely in block form.

The vacuum pump 176 draws air in through the orifices 122 and 124 and through the interior of the drum 10 down the shaft 144 and through the conduit 174. This creates a vacuum pressure at the outer peripheral surface of the annular portion 120 of the lower section of the drum 10 to firmly retain the cards on that surface.

As noted above, the gate transfer mechanism 16 is shown in greater detail in FIGURE 3. As also noted, the gate transfer mechanism 18 may be constructed in the same manner. The gate transfer mechanism 16 includes a body portion 180 which has a teardrop configuration when viewed in plan view in FIGURE 1. The body portion 180 tapers towards its forward end, and it encloses a bell-shaped chamber 182 and a passageway 184 which communicates with the chamber. An apertured plate 186 encloses the forward end of the chamber 182 at the tapered end of the body 180. The plate 186 has a pair of apertures 188 formed in it, and these apertures are respectively aligned with the orifices 122 and 124 in the drum 10.

A fitting 190 is threaded into the body portion 180, and this fitting is in the form of a tubular bushing which communicates with the passageway 184, the passageway in turn communicating with the rear portion of the chamber 182. The fitting 190 extends downwardly from the gate mechanism 16 through an aperture in the table top 11. A nut 194 is threaded to the portion of the fittng 190 protruding through the bottom of the table top. This nut may be tightened so as to securely hold the body portion 180 at the desired tangential inclination to the drum 10. A suitable line 196 is coupled to the fitting 194 through a coupling 198. This line is, in turn, coupled to a suitable air pressure source.

Air under pressure from the source is introduced through the line 196 and through the fitting 190 into the passageway 184. The air pressure then passes to the chamber 182 and it emerges as high velocity air streams through the apertures 188 in the plate 186. These air streams pass along the periphery of the drum 18 and strip from the drum the leading edge of a card transported by the drum into the vicinity of these streams. The streams cause the leading edge of the card to move outwardly from the periphery of the drum 10 into the influence of the vacuum pressure at the periphery of the drum 14. The leading edge of the card is then drawn to the periphery of the drum 14, and the gate mechanism 16 serves to strip the card from the drum 10 and to deposit it one the periphery of the drum 14.

As noted above, the holding station 28 is shown in greater detail in FIGURE 4, and the holding station 36 may be similarly constructed. These holding stations may be similar to those disclosed and claimed in copending application Ser. No. 638,033 filed February 4, 1957 in the name of Alfred M. Nelson et al. Alternately, they may be similar to the card holding station disclosed and claimed in commonly assigned copending application Ser. No. 689,347, filed October 10, 1957 now Patent No. 2,905,466, in the name of Eric Azari et al.

The holding station 28 includes a pawl member 200 having a pair of fingers 202 and 204 which extend into the peripheral grooves on the drum 10 adjacent the orifices 122 and 124. The extremities of these fingers extend into the grooves flush with the outer surface of the peripheral edge of the drum 10. However, the intermediate portions of the fingers are humped outwardly in a radial direction from the peripheral edge of the drum. The fingers 202 and 204 are supported by means of a rectangular shaped bracket 206 which, in turn, is secured to a block 208 on the table top 11.

The arrangement is such that any card tarnsported on the periphery of the drum 10 to the holding station 28 is carried up over the fingers 202 and 204, and such card is moved along the fingers outwardly in a radial direction from the peripheral edge of the drum.

The holding station 28 also includes a holding member 210. This member has an arcuate-shaped surface 212 which faces the peripheral edge of the drum 10 and which is spaced from that edge. The holding member 210 is supported in the bracket 206, and its surface 212 is spaced from the fingers 202 and 204 and from the portion of the bracket 206 which lies in substantially the same plane as the fingers. This spacing corresponds approximately to the thickness of the cards transported by the drum 10. Thus, and as noted above, in the absence of any further restraining force, any card transported to the holding stations 28 by the drum 10 rides up over the fingers 202 and 204 and through the bracket 206 between that bracket and the arcuate surface 212 of the holding member 210.

The holding member 210 is generally hollow to define a chamber. The surface 212 has a pair of arcuate slots 214 and 216 which extend along that surface in alignment with the orifices 122 and 124 in the drum 10. The vacuum pressure feed line 31 couples the chamber defined in the holding member 210 to a suitable vacuum pump, and as mentioned, the solenoid-controlled valve 30 is interposed in that line.

Whenever the solenoid valve is not energized, it is opened to permit the vacuum pump to draw air inwardly through the slots 214 and 216 and through the chamber in the holding member 210. This creates a vacuum pressure at the surface 212 of the holding member 210. When the solenoid winding of the valve 220 is not energized, a card transported by the drum 10 to the fingers 202 and 204 is moved up by the fingers and by the end of the bracket 206 until it covers the surface 212 of the holding member 210. The vacuum pressure exerted by the slots 214 and 216 is then sufficient to hold the card stationary. The card is so held against the force exerted on it by the drum 10, and with its trailing edge engaging the periphery of the drum the drum continues to rotate. As noted above, this holding of the card may continue for a selected interval, and the card may be released by energizing the solenoid valve 30 so that the card is able to continue to be transported by the drum 10. The control of the solenoid valve 30 may be tied in with the control of the solenoid valve 24, as will be described, so that each time a card is released from the hold station 28, a new card is released from the input station 20. Of course, the control of these two valves may be independent, if so desired.

The input station 20 is preferably given an angular position on the periphery of the drum 10 such that a card released by the holding station 28 would take approximately the same time to reach the contiguous point between the drums 14 and 12 as such card is transported on the drum 14, as would a card released from the holding station 36 and transported on the drum 12. This assures that the cards on the drum 14 will follow one another closely and without any waste space on the periphery of the drum 14, regardless of whether any particular card was released from the card holding station 28 or from the holding station 36.

In FIGURE 5, the card 300 represents an information storage card from the input station 20, the card being carried by the vacuum pressure transporting drum 10 to be processed by the transducer means 26. The transducer means 26 is represented in FIGURE 5 by a series of electro-magnetic transducer heads **26*a*, 26*b*, 26*c* and 26*d***.

The data is recorded on the card 300 in a series of rows which extend lengthwise across the card. These rows are shown in FIGURE 5 as extending in a horizontal direction. Each of these rows is scanned by a different one of the heads **26*a*, 26*b*, 26*c* and 26*d*. The heads 26*a*, 26*b* and 26*c*** respectively scan three rows of data. It should be evident that more or less rows can be used and that a corresponding number of heads can be provided depending upon the number of rows so used. The data in the various rows may be represented by magnetic dots of one polarity or the other although other forms of data such as holes or photographic bits may also be used. The information is preferably recorded in binary form so that the various magnetic areas represent different bits of binary information as determined by the polarities of these areas.

The bits of binary information in the various rows are disposed so that they extend in transverse columns across the card corresponding to the vertical direction in FIGURE 5. Each transverse column represents a different binary number and corresponds to a "position" on the card. Each position on the card is represented by a clock recording, and these clock recordings extend along the lower row of the card so that these recordings may be scanned by the transducer head **26*d*. These latter recordings, for example, are of a single polarity, and the head 26*d*** produces an electrical pulse for each position of the card scanned.

The card 302 in FIGURE 5 is intended to represent one of the cards from the input means 32, the card being carried by the transporting drum 12 to be processed by the transducer means 34. The transducer means 34 in FIGURE 5 is represented by a series of transducer heads **34*a*, 34*b*, 34*c* and 34*d*. As is the case of the card 300, the heads 34*a*, 34*b* and 34*c* scan different rows of binary data on the card 302, and the head 34*d*** scans the clock row on that card.

The transducer heads **26*a*, 26*b* 26*c* and 26*d* are respectively connected to a series of amplifiers 304, 306, 308 and 310. The transducer heads 34*a*, 34*b*, 34*c* and 34*d*, on the other hand, are respectively connected to a series of amplifiers 312, 314 and 316 and 318**.

The amplifiers 304, 306 and 308 are respectively connected to the left input terminal of each of a series of flip-flops 320, 322 and 324, and to each of a series of associated inverters 326, 328 and 330. The output terminals of these inverters are respectively connected to the right input terminals of the flip-flop 320, 322 and 324.

The flip-flops may be constructed in a manner similar to that described on pages 164, 166, inclusive, of volume 19 entitled "Wave Forms" of the Radiation Laboratories Series published in 1949 by the Massachusetts Institute of Technology.

These flip-flops are bistable relaxation circuits. Each of the flip-flops is provided with two input terminals designated for convenience as the left and right input terminals, and each is provided with two output terminals designated for convenience as the left and right output terminals. The input terminals are shown at the bottom of the block representing the flip-flop and the output terminals are shown at the top of the block. A negative input signal introduced to either of the input terminals produces a relatively high voltage at the corresponding output terminal of the flip-flop. The flip-flop is said to be in a "true" state when a relatively high voltage appears at its left output terminal, and it is said to be in a "false" state when a relatively high voltage appears at its right output terminal.

The left and right output terminals of the flip-flop 320 are connected respectively to an "and" network 332 and to an "and" network 334. The left and right output terminals of the flip-flop 322 are connected respectively to an "and" network 336 and to an "and" network 338. Likewise, the left and right output terminals of the flip-flop 324 are connected respectively to an "and" network 340 and to an "and" network 342.

The "and" networks may be constructed in a manner similar to that described on page 32 of "Arithmetic Operations in Digital Computers" by R. K. Richards( published by D. Van Nostrand Company, Inc. of Princeton, New Jersey, in 1955). Each of the "and" networks is provided with a plurality of input terminals, and each is constructed in known manner so that a signal passes through the network only when positive signals are simultaneously impressed on all the input terminals of the network.

The "and" networks 332 and 334 are connected respectively to the left and right input terminals of a flip-flop 344. The "and" networks 336 and 338 are connected respectively to the left and right input terminals of a flip-flop 346. Also, the "and" networks 340 and 342 are connected respectively to the left and right input terminals of a flip-flop 348.

The amplifier 310 is connected to the left input terminal of a flip-flop 350 and to the input terminal of a delay line 352. The output terminal of the delay line is connected to the right input terminal of the flip-flop 352. The left output terminal of the flip-flop 350 is connected to a binary counter 354. The binary counter is connected to an adjustable selector 356 which, in turn, is connected to a compare network 358. This selector may be controlled automatically in accordance with a predetermined program so that the sorting of the cards may proceed from column to column. Alternately, the selector may be manually controlled.

The arrangement of the binary counter 354, the selector 356 and the compare network 358 is fully described in copending application Ser. No. 566,404 filed February 20, 1956, by Jerome B. Wiener. Briefly, the delay line 352 imparts a delay to each pulse from the amplifier 310 so that the pulse first triggers the flip-flop 350 from a true state to a false state, and then the delayed pulse returns the flip-flop to the original true state before the next pulse from the amplifier 310 triggers the flip-flop to its false state. Therefore, a series of pulses appears at the left output terminal of the flip-flop 350 corresponding to the clock recordings scanned by the head **26*d* which, in turn, correspond to successive positions on the card 300**.

The pulses from the flip-flop 350 are applied to the binary counter 354. The binary counter comprises a series of flip-flops connected in known manner to be successively triggered from one state to another in response to the pulses from the flip-flop 350.

The selector 356 may comprise a series of switches which are connected to the various flip-flops in the binary counter 354. These switches selectively connect one or the other of the output terminals of these flip-flops to the compare network 358. These switches may be manually adjustable so that the flip-flops in the binary counter are required to assume a selected pattern before the compare network 358 will translate an output signal. This pattern corresponds to a selected count of the binary counter 354 which, in turn, corresponds to a selected position on the card 300.

Therefore, by the manual adjustment of the selector 356, the compare network 358 may be made to produce an output pulse for a particular selected position on the card 300 and only for that position. The pulse from the compare network 358 is introduced to each of the "and" networks 332, 334, 336, 338, 340 and 342. These "and" networks, therefore, become conditioned for conduction only for the selected position on the card 300.

The amplifiers 312, 314, 316 are connected respectively to the left input terminals of a series of flip-flops 360, 362, and 364, and to the input terminals of a corresponding series of inverters 366, 368 and 370. The output terminals of the inverters are connected respectively to the right input terminals of the flip-flops 360, 362 and 364.

The inverters 366, 368 and 370, as well as the inverters 326, 328 and 330, are usual phase inverters and serve to reverse the polarity of the pulses introduced to them. These inverters, for example, may be simple vacuum tube circuits.

The left and right output terminals of the flip-flop 360 are connected respectively to an "and" network 372 and to an "and" network 374. The left and right output terminals of the flip-flop 362 are connected respectively to an "and" network 376 and to an "and" network 378. Finally, the left and right output terminals of the flip-flop 364 are connected respectively to an "and" network 380 and to an "and" network 382.

The "and" networks 372 and 374 are connected respectively to the left and right input terminals of a flip-flop 384. The "and" networks 376 and 378 are connected respectively to the left and right input terminals of a flip-flop 386. Moreover, the "and" networks 380 and 382 are connected respectively to the left and right input terminals of a flip-flop 388.

The amplifier 318 is connected to the left input terminal of a flip-flop 390 and to the input terminal of a delay line 392. The output terminal of the delay line is connected to the right input terminal of the flip-flop 390. The left output terminal of the flip-flop 390 is connected to a binary counter 394. The binary counter 394 is connected to a selector 396 which, in turn, is connected to a compare network 398. The compare network 398 is connected to an input terminal of each of the "and" networks 372, 374, 376, 378, 380 and 382. The arrangement of the binary counter 394, the selector 396 and the compare network 398 may be similar to the arrangement described above of the binary counter 354, the selector 356 and the compare network 358.

The output terminals of the flip-flops 344, 346, 348, 384, 386 and 388 are all connected to respective input terminals of a comparator 400. The comparator 400 is shown in block form for purposes of simplicity. The comparator is formed from a plurality of "and" and "or" networks interrelated in a logical pattern. The comparator may be constructed and operated in a manner similar to that disclosed in co-pending application Serial Number 566,404 filed February 20, 1956 by Jerome B. Wiener.

In a manner to be described, the flip-flops 344, 346 and 348 may be triggered into a pattern of operational states which represent a decimal number in a binary code. In like manner, the flip-flops 384, 386 and 388 may be triggered to a pattern of operational states which also represents a decimal number in a binary code. It should also be appreciated that the flip-flops may be triggered into patterns representing conventional binary codes.

The comparator 400 functions to compare a pair of decimal numbers in binary code with one another. Should one of the decimal numbers exceed the other, the comparator 400 develops a pulse on its output lead 402. Should the decimal numbers be equal, the comparator develops a pulse on its output lead 404. Finally, should the other decimal number exceed the first, the comparator develops a pulse on its output lead 406. The comparator accomplishes this result in a manner understood in the art, and as described in the application referred to above.

The leads 404 and 406 from the comparator 400 are connected to an "or" network 408. This "or" network may be any of the well known types of such networks which are now in general use in the computer art. These networks are conditioned to pass a signal upon the introduction of a positive signal to any one or more of its input terminals. The "or" network may be constructed in a manner similar to that described on page 32 of "Arithmetic Operations in Digital Computers" by R. K. Richards (published by D. Van Nostrand Company, Inc. of Princeton, New Jersey, in 1955).

The output terminal of the "or" network 408 is connected to the left input terminal of a flip-flop 410 and to the input terminal of a delay line 412. The output terminal of the delay line is connected to the right input terminal of the flip-flop.

The left output terminal of the flip-flop 410 is connected to the control grid of a triode 414. A resistor 416 is connected to the control grid and to the negative terminal of a source of direct voltage 418. The cathode of the triode is grounded, and its anode is connected to one terminal of the energizing winding of the solenoid valve 30 associated with the hold station 28. The other terminal of this energizing winding is connected to one terminal of the energizing winding of the solenoid valve 24 associated with the feed head 22. The other terminal of the latter solenoid winding is connected to the positive terminal of the source 418, the source having a common terminal connected to ground.

The output lead 402 from the comparator 400 is also connected to the left input terminal of a flip-flop 419 and to the input terminal of a delay line 420. The output terminal of the delay line is connected to the right input terminal of the flip-flop 419. The left output terminal of the flip-flop 419 is connected to the control grid of a triode 422. A resistor 424 is connected to the control grid of the triode 422 and to the negative terminal of the source 418.

The cathode of the triode 422 is grounded. Its anode is connected to the energizing winding of the solenoid valve 38 associated with the holding station 36. This energizing winding is connected in series with the energizing winding of the solenoid valve 42 to the positive terminal of the source 418. The solenoid valve 42 is associated with the feed head 40 of the input station 32.

The positive terminal of the source 418 is connected to the armature of a pushbutton type of manually operated start switch 426. The fixed contact of the switch 426 is connected to a capacitor 428, and the capacitor is connected to the input terminal of a differentiator 430. The differentiator may be constructed in a manner similar to that described on pages 2–27 to 2–38 inclusive of "Principles of Radar" (Second Edition) published by the Massachusetts Institute of Technology.

The differentiator 430 is connected to the left input terminal of a flip-flop 432 and to the input terminal of a delay line 434. The output terminal of the delay line is connected to the right input terminal of the flip-flop 432.

The left output terminal of the flip-flop 432 is connected to the control grid of a triode 436 and to the control grid of a triode 438. The cathodes of these triodes are both grounded. A pair of resistors 440 and 442 are connected from the negative terminal of the source 418 to the respective control grids of the triodes 436 and 438. The anode of the triode 436 is connected to the common junction of the energizing windings of the solenoid valves 24 and 30. The anode of the triode 438 is connected to the common junction of the energizing windings of the solenoid valves 38 and 42.

To carry out the purpose of the present invention, as described above, a first stack of cards is placed in the input station 20, and a second stack is placed in the input station 32. The cards of both these stacks are to be processed with respect to the binary data recorded at a particular position on the cards of each stack. Moreover, the cards stacked in the station 20 are assumed to be sorted in an ascending order with respect to the binary data at the selected position, and the cards stacked in the input station 32 are also assumed to be sorted with respect to the binary data in ascending order at the selected position.

The selectors 356 and 396 are adjusted so that the compare networks 358 and 398 will condition the "and" networks 332, 334, 336, 338, 340 and 342 and the "and" networks 372, 374, 376, 378, 380 and 382 for conduction only at the selected position on each of the cards from the input station 20 and from the input station 32.

The start switch 426 is then depressed. This causes a charge of current to flow into the capacitor 428 so that a pulse is introduced to the differentiator 430. The differentiator produces in response to that pulse an output pulse having a sharp negative going edge, and this output pulse triggers the flip-flop 432 to its true state.

The triggering of the flip-flop 432 to its true state produces a relatively high voltage of positive polarity at its left output terminal. This voltage overcomes the negative bias on the control grids of the triodes 436 and 438 to render both of these triodes conductive. The conductivity of the triodes results in a current flow through the energizing windings of the solenoid valves 24 and 42 to close both of these valves. The first cards in the input stations 20 and 32 become respectively transferred to the drums 10 and 12 for movement with the drums The release of these cards is due to the fact that the energizing of the solenoid valves 24 and 42 causes them momentarily to close and interrupt the vacuum pressure to the feed heads 22 and 40.

The delay line 434 causes the pulse from the differentiator 430 to return the flip-flop 432 to a false state. The timing is such that this occurs after the first card has been released from both the stations but in time to prevent any further cards from being released from the stations.

The solenoid valves 30 and 38 are not activated during this starting operation. Therefore the first card from the input station 20 travels past the transducer heads 26*a*, 26*b*, 26*c* and 26*d* to the holding station 28, and the first card from the input station 32 travels past the heads 34*a*, 34*b*, 34*c* and 34*d* to the holding station 36, and both these cards are held at the holding stations.

As the first card from the input station 20 is processed by the transducer heads 26*a*, 26*b* and 26*c*, the resulting pulses from the amplifiers 304, 306 and 308 trigger the flip-flops 320, 322 and 324 into a pattern of operational states at each position on the card which corresponds to a binary number recorded at that position. However, the "and" networks 332, 334, 336, 338, 340 and 342 are conditioned for translation only at the selected position, so that the flip-flops 344, 346 and 348 are conditioned into a pattern of operational states corresponding to the binary number recorded at the selected position.

In exactly the same manner, the flip-flops 384, 386 and 388 are triggered into a pattern of operational states which represent the binary data recorded at the particular selected position of the card from the input station 32.

Should the number represented by the binary data recorded at the selected position of the first card from the input station 20 be less than the number represented by the binary data recorded at the selected position of the card from the input station 32, the comparator 400 will develop a pulse on its output lead 406. This pulse triggers the flip-flop 410 to its true state, so that a relatively high positive voltage appears at its left output terminal. This voltage overcomes the negative bias on the control grid of the triode 414 and the triode is rendered conductive. This conductivity of the triode 414 causes both the solenoid valves 24 and 30 to be energized so that the held card is released from the hold station 28 and a new card is released from the input station 20. The flip-flop 410 is conditioned to its true state only long enough to permit the single card to be released from the hold station and from the input station, and then the delayed pulse from the delay line 412 returns the flip-flop 410 to its false state. During this interval, the triode 422 remains nonconductive so that the card held by the holding station 36 continues to be held and the cards in the input station 32 remain in that station.

In this manner, cards are successively and continuously released from the holding station 28 and from the input station 20 until the number at the selected position of a particular card processed by the transducer heads 26*a*, 26*b* and 26*c* is greater than the number at the selected position on the card held in the holding station 36. When this occurs, no pulse appears on the leads 404 and 406 from the comparator 400 and the processed card is therefore held in the holding station 28 and no further card is released from the input station 20. However, a pulse appears on the output lead 402 from the comparator 400 to trigger the flip-flop 419 to its true state. This triggering of the flip-flop 419 causes the triode 422 to become conductive which, in turn, causes the held card to be released from the holding station 36 and a new card to be released from the input station 32.

Now, cards are successively released from the holding station 36 and from the input station 32 each time a pulse appears on the lead 402 and this occurs until the number at the selected position of a subsequent card being processed equals or becomes greater than the number at the selected position on the card held by the holding station 28. The latter situation causes pulses again to appear on one of the leads 404 and 406 so that cards are again released by the holding station 28 and from the input station 20.

As described previously, whenever a card is released from the holding station 28 or from the holding station 36, such cards are transferred to the drum 14 to be deposited in the output station 44. As also noted above, the distance of the holding station 28 from the adjacent point of the drums 10 and 14 and from there to the adjacent point of the drums 12 and 14 is preferably made approximately equal to the distance of the holding station 36 from the adjacent point of the drums 12 and 14. With this spacing, a card released from the holding station 36 will arrive at the adjacent point between the drums 12 and 14 at the same time as a card released by the holding station 28. Therefore, alternate releases of cards from either one of the holding stations will result in a continuous flow of cards on the drum 14 with a minimum of spacing between successive cards.

The transducer means 26, as previously noted, is placed adjacent the wall of the station 20, and the transducer means 34 is placed adjacent the wall of the station 32. The holding stations 28 and 36 are spaced from these walls a distance corresponding to the length of a single card. Therefore, cards successively released from either one of the holding stations also appear closely following one another on the drum 14. In this manner, no matter how the release of the cards occurs, they are transported in a closely spaced progression on the drum 14. This precludes any lost space or time in the system of the invention.

It should be noted that when physical limitations prevent the transducer means 34 from being placed directly against the wall of the station 32, the identifying data on each card may be recorded on a forward portion of the card. This enables the decision to be made, as to whether the card is to be held or released, before the card is completely clear of the station, even though the transducer means is spaced from the wall of the station. This, therefore, likewise prevents any lost space or time in the system of the invention.

Therefore, the cards in the input station 20 and in the input station 32 are alternately released or held in a predetermined manner. This enables an ascending progression of sorted cards in each of the input stations to be merged into a single stack in a sorted ascending order in the receiving station 40.

Although this application has been disclosed and illustrated with reference to particular applications, the principles involved are susceptible of numerous other applications which will be apparent to persons skilled in the art. The invention is, therefore, to be limited only as indicated by the scope of the appended claims.

It should be appreciated that the apparatus described above and shown in the drawings is included only by way of example to illustrate the principles of operation of this invention. For example, a plurality of holding stations can be used in combination with a plurality of input stations, transducers and associated circuitry to process cards in a manner different from that obtained by the operation of the comparator 400. By way of illustration, the cards do not have to be merged in the order of progressive informational significance as described above but can be merged in some other manner. The cards can also be processed in some other manner than merging such as by collating and sorting. In all of these systems, the holding stations may be positioned relatively close to the transducers and the input stations to enhance the speed at which the cards become processed.

I claim:

1. In a system for merging information storage cards from a plurality of individual stacks, the combination of: a first vacuum pressure rotatable transporting drum, a second vacuum pressure rotatable transporting drum, first and second card feeding stations respectively positioned adjacent said first and second transporting drums and individually controllable to feed cards in succession to said first and second drums, a common rotatable vacuum pressure transporting drum positioned adjacent said first and second drums, first and second means for respectively feeding cards from said first and second drums to said common drum, first transducer means for processing cards transported on said first drum and for generating electric signals in response thereto, first card holding means for controllably arresting cards transported on said first drum, second transducer means for processing cards transported on said second drum and for generating electric signals in response thereto, second card holding means for controllably arresting cards transported on said second drum, a receiving station for receiving cards transported on said common drum, control means responsive to the electric signals from said first and second transducer means for selectively controlling the release of cards from said first and second card holding means for transfer to said common drum, and further control means for causing a card to be released from the one of said first and second card feeding stations corresponding to the one of said first and second card holding stations from which a card is released at any particular time.

2. In a system for merging information storage cards from a plurality of individual stacks, the combination of: a first horizontal rotatable vacuum pressure drum, a second horizontal rotatable vacuum pressure drum positioned in uniplanar relation with said first drum, first and second card feeding stations respectively positioned adjacent said first and second drums and individually controllable to feed cards in succession to respective ones of said first and second drums, a third horizontal rotatable vacuum pressure transporting drum positioned adjacent said first and second drums in uniplanar relationship therewith, first and second gate means for respectively obtaining the transfer of cards from said first drum and from said second drum to said third drum, a first series of transducer heads for processing cards transported on said first drum and for generating electric signals in response thereto, a first card holding unit positioned adjacent said first drum for controllably arresting the cards transported thereon, a second series of transducer heads for processing cards transported on said second transporting drum and for generating electric signals in response thereto, a second card holding unit positioned adjacent said second drum for controllably arresting cards transported thereon, a card receiving station positioned adjacent said third drum for receiving cards therefrom, and control means for comparing the signals from said first series of transducer heads with the signals from said second series of transducer heads to obtain the release of a card from said first card holding unit and from said first feeding station for a particular set of conditions indicated by such comparison, and to obtain the release of a card from said second card holding unit and from said second feeding station for a different set of conditions as determined by such comparison.

3. In a system for merging information cards from a plurality of input stacks, the combination of: a first and a second vacuum pressure rotatable transporting drum, first and second card feeding stations respectively positioned adjacent said first and second transporting drums, each of said stations having a leading wall and a trailing wall with respect to the rotation of the adjacent one of said first and second drums, a common rotatable vacuum pressure transporting drum positioned adjacent said first and second drums, first transducer means positioned adjacent said first drum and contiguous to the trailing wall of said first feeding station, a first card holding means positioned adjacent said first drum and displaced from the trailing wall of said first feeding station a distance corresponding to the length of one of the cards, second transducer means positioned adjacent said second drum and contiguous to the trailing wall of said second feeding station, and a second card holding means positioned adjacent said second drum and displaced from the trailing wall of said second feeding station a distance corresponding to the length of one of the cards, said first and second card feeding stations and said first and second card holding means being so disposed that a card released from said first card holding means travels to the adjacent point of said second drum and said common drum in the same time as a card released from said second card holding means.

4. In a system for merging information cards from a plurality of individual stacks, the combination of: a first and a second vacuum pressure rotatable transporting drum, first and second card feeding stations respectively positioned adjacent said first and second transporting drums and individually controllable to feed cards in succession to said first and second drums, each of said stations having a leading wall and a trailing wall with respect to the rotation of the adjacent one of said first and second drums, a common rotatable vacuum pressure transporting drum positioned adjacent said first and second drums, first and second means for respectively feeding cards from said first and second drums to said common drum, first transducer means positioned contiguous to the trailing wall of said first feeding station for processing cards transported on said first drum and for generating electric signals in response thereto, first card holding means displaced from said trailing wall of said first feeding station an amount corresponding to the length of one of the cards for controllably arresting cards transported on said first drum, second transducer means positioned contiguous to the trailing wall of said second feeding station for processing cards transported on said second drum and for generating electric signals in response thereto, second card holding means displaced from said trailing wall of said second station an amount corresponding to the length of one of the cards for controllably arresting cards transported on said second drum, a receiving station for receiving cards transported on said common drum, control means responsive to the electric signal from said first and second transducer means for selectively controlling the release of cards from said first and second card holding means for transfer to said common drum, and further control means for causing a card to be released from the one of said first and second card feeding stations corresponding to the one of said first and second card holding stations from which a card is released at any particular time, said first and second card holding means and said first and second feeding stations being so disposed that a card released from said first card holding means travel to the adjacent point of said second drum and said common drum in the same time as a card released from said second card holding means.

5. In an information storage card processing system, the combination of: transporting means constructed to obtain a continuous movement of cards, means including input means for obtaining a controlled transfer of cards to said transporting means, holding means constructed and disposed relative to the cards on the transport means for providing for the continuous movement of first particular cards past the holding means without any arresting of the continuous movement of such first particular cards and for positively arresting the continuous movement of second particular cards transported by the transporting means, and control means responsive to information recorded on the cards transported on said transporting means for obtaining a controlled holding and subsequent release of the second particular cards by said holding means in accordance with such information and for providing for the continuous movement of the first particular cards past the holding means without any arresting of the continuous movement of such other cards.

6. In an information storage card processing system, the combination of: transporting means constructed to obtain a continuous movement of cards, means including a plurality of separate input means for obtaining a controlled transfer of cards to said transporting means, a corresponding plurality of separate holding means each constructed and disposed relative to the cards on the transporting means for providing for a continuous movement of first particular cards past the holding means without any arresting of the continuous movement of such first particular cards and for positively arresting the continuous movement of second particular cards transferred to said transporting means from respective ones of said input means, and control means responsive to information recorded on the cards transferred to said transporting means from different ones of said input means for obtaining a controlled arresting and subsequent release of the second particular cards by such different ones of said holding means in accordance with such information and for providing for the continuous movement of the first particular cards past the other holding means in the plurality without any arresting of the continuous movement of such first particular cards.

7. In an information storage card processing system, the combination of: transporting means operative upon the cards to obtain a continuous movement of the cards, means including a plurality of separate input means for obtaining a controlled transfer of cards from the input means to the transporting means, a corresponding plurality of separate holding means each constructed and disposed relative to the cards on the transport means for providing for the movement of first particular cards past the holding means without any arresting of the movements of such first particular cards and for positively arresting on a controlled basis the continuous movements of second particular cards transferred to said transporting means from a different one of the input means in the plurality, and control means responsive to particular information on the transported cards for obtaining the release of successive cards from each individual input means in the plurality and for obtaining the movement of such cards past the holding means associated with that individual input means without any arresting of the continuous movement of such cards and for operating upon the associated holding means in accordance with the particular information on the cards to obtain an arresting of one of the second particular cards and for thereafter obtaining the release of successive cards from a different one of the input means in the plurality and for obtaining the movement of such cards past the holding means associated with such different one of the input means in the plurality without any arresting of the continuous movement of such cards until the transfer of a second particular card from such different one of the input means in the plurality.

8. In an information storage card processing system, the combination of: transporting means operative upon the cards to obtain a continuous movement of the cards, means including a plurality of separate input means for obtaining a controlled transfer of cards from the input means in the plurality to said transporting means, means including a plurality of transducer means each constructed and disposed relative to cards on the transporting means for processing particular information on the cards transferred to said transporting means from an individual one of said input means in the plurality and for producing electric signals in accordance with such processing, means including a plurality of separate holding means each constructed and disposed relative to cards on the transporting means for providing for a continuous movement of first particular cards past the holding means without any arresting of the continuous movement of such first particular cards and for controllably arresting the continuous movement of second particular cards transferred to said transporting means from an individual one of the input means in the plurality, and control means responsive to the electric signals from said transducer means for providing a controlled operation of the input means in the plurality and the holding means in the plurality to obtain a release of successive cards from a first particular one of the input means in the plurality and a continuous movement of such cards past the holding means associated with the first particular input means and to obtain an arresting of a particular one of the cards in accordance with the information processed on the cards and thereafter to obtain a release of successive cards from a second particular one of the input means in the plurality and a continuous movement of such cards past the holding means associated with the second particular input means until the movement to such associated holding means of a card having particular information processed on the card.

9. In an information storage card processing system, the combination of: transporting means operative upon the cards to obtain a continuous movement of the cards, means including a pair of input means for obtaining a controlled transfer of cards to said transporting means, means including a pair of holding means each constructed and disposed relative to transported cards for obtaining a continuous movement of first particular cards past the holding means without any arresting of such cards by the holding means and for positively arresting on a controlled basis the continuous movement of second particular cards transferred to the transporting means from a different one of the input means in the pair, means responsive to particular information on the transported cards for comparing the particular information on successive cards transferred to the transporting means from one of the input means with the particular information on successive cards transferred to the transporting means from the other of said input means, and means operatively coupled to the comparing means for controlling the operation of the pair of input means and the pair of holding means to obtain a successive transfer of cards in each individual input means to the transporting means and for obtaining a continuous movement of such cards past the individual one of the holding means associated with such individual input means without any arresting of such cards by the associated holding means and for obtaining an arresting of a first individual one of the cards by such individual one of the holding means in accordance with the information processed on such first individual card and to obtain a successive transfer of cards in the other input means to the transporting means and for obtaining a continuous movement of the cards past the other holding means without any arresting of cards by such holding means and for obtaining an arresting of a second individual one of the cards by such other holding means in accordance with the information processed on such second individual card and for obtaining a release of the first individual card by the individual one of the holding means.

10. In an information storage card processing system, the combination of: transporting means constructed to obtain a continuous movement of the cards, means including a pair of separate input means for holding cards and including retaining means constructed and disposed relative to the cards in the input means for obtaining a controlled transfer of cards to said transporting means from said input means, means including a pair of separate holding means each constructed and disposed relative to the transported cards for providing for the continuous movement of first particular cards past the holding means without any arresting of such cards by the holding means and for positively arresting on a controlled basis the continuous movement of second particular cards transferred to said transporting means from a different one of the input means in the pair, comparison means responsive to particular information on the transported cards for comparing the particular information on successive cards transferred to the transporting means from one of the input means with the particular information on successive cards transferred to the transporting means from the other of the input means to produce signals in accordance with such comparison, means responsive to the signals from the comparison means for operating on a particular one of the retaining means in the pair and the associated one of the holding means in the pair to prevent a transfer of cards from the associated one of the retaining means in the pair to the transporting means and to provide for an arresting of cards by the associated holding means, and means responsive to the signals from the comparison means for operating upon the other retaining means and the holding means associated with such other retaining means to provide for a transfer of successive cards to the transporting means from the input means associated with such other retaining means and to provide for a continuous movement of such cards past the holding means associated with such other retaining means without any arresting of such cards.

11. In an information storage card processing system, the combination of: transporting means operative upon the cards to obtain a continuous movement of the cards, means including a pair of separate input means each constructed to hold cards and each including retaining means constructed and disposed relative to the cards in the input means for obtaining a controlled transfer of the cards in the input means to said transporting means, means including a pair of transducer means constructed and disposed relative to the cards on the transporting means for sensing and processing particular information on the cards transferred to said transporting means from a different one of said input means in the pair and for providing electric signals in accordance with such processing, means including a pair of separate holding means each constructed and disposed relative to cards on the transporting means for providing for the continuous movement of first particular cards past the holding means without any arresting of such cards by the holding means and for positively arresting on a controlled basis the continuous movement of second particular cards transferred to said transporting means from a different one of the input means in the pair, comparison means responsive to the electric signals from said transducer means for comparing the particular information on successive cards transferred to the transporting means from one of the input means with the particular information on successive cards transferred to the transporting means from the other of said input means, means operatively coupled to the comparison means for operating on the holding means in each of a plurality of successive operations to obtain the arresting of a second individual card by a selected one of said holding means in accordance with the operation of the comparison means and to obtain a continuous movement of cards past the other holding means without any arresting of such cards by such other holding means, and means operatively coupled to the comparison means for operating upon the retaining means to prevent the release of a card from the particular one of said input means associated with the selected one of the holding means and to obtain the successive release of cards from the other one of the input means.

12. In a system for merging information storage cards from a plurality of separate individually sorted stacks into a common sorted stacked condition, the combination of: transporting means constructed to obtain a continuous movement of the cards, means including a plurality of separate retaining means each constructed and disposed relative to the cards in a different one of the stacks in the plurality for obtaining a controlled transfer of cards from the individual stacks to said transporting means, means including a plurality of separate holding means each constructed and disposed relative to the cards transferred to the transporting means from a different one of the stacks in the plurality for providing for the continuous movement of first particular cards past the holding means without any arresting of such cards by the holding means and for positively arresting on a controlled basis the continuous movement of second particular cards transferred to the transporting means from the associated one of the stacks in the plurality, control means responsive to particular information on the cards transferred to said transporting means from the stacks for operating on the holding means to provide a controlled arresting of the second particular cards by a particular one of said holding means in the plurality in accordance with the particular information on the cards and to provide for a continuous movement of the first particular cards past the other holding means in the plurality without any arresting of the movement of such cards, and output means constructed and disposed relative to the transported cards for receiving cards from said transporting means in an order dependent upon the movement of the cards past said different holding means.

13. In a system for merging information storage cards, the combination of: transporting means constructed to obtain a continuous movement of the cards, means including a plurality of separate card holding stations each constructed to hold cards and each including retaining means constructed and disposed relative to the cards in the stations for obtaining a controlled transfer of cards from the individual stations in the plurality in sequence to said transporting means, means including a plurality of transducer means each constructed and disposed relative to the cards transferred to the transporting means from a different one of the stations in the plurality for processing particular information on the cards transferred to said transporting means from the associated one of said card holding stations in the plurality and for deriving electric signals in accordance with the particular information on the cards, means including a plurality of separate card holding means each constructed and disposed relative to transported cards for providing for a continuous movement of first particular cards past the holding means without any arresting of such cards by the holding means and for positively arresting on a controlled basis the continuous movement of second particular cards transferred to said transporting means from a different one of the card holding stations in the plurality, control means responsive to the electric signals from said transducer means for operating on the card holding means in the plurality to obtain an arresting of the second particular cards by individual ones of said holding means in the plurality at each instant in accordance with the particular information on the cards and to provide for a continuous movement of the first particular cards past the other holding means in the plurality, and output means constructed and disposed relative to the transported cards for receiving cards from said transporting means in an order dependent upon the movement of the cards past the different holding means in the plurality.

14. In a system for merging information storage cards, the combination of: first and second transporting means each constructed to obtain a continuous movement of cards, means including first and second card feeding stations each constructed to hold cards and each including retaining means constructed and disposed relative to the cards in the stations for obtaining a transfer of cards successively to respective ones of said first and second transporting means, means including first transducer means constructed and disposed relative to the cards on the first transport means for processing particular information on cards transported on said first transporting means and for generating electric signals in accordance with such particular information, means including first card holding means constructed and disposed relative to the cards on the first transporting means for positively arresting on a controlled basis at first periods of time the continuous movement of first particular cards transported on said first transporting means and for providing for a continuous movement of cards past such holding means at second periods without any arresting of such cards by the holding means, means including second transducer means constructed and disposed relative to the cards on the second transporting means for processing particular information on cards transported on said second transporting means and for generating electric signals in accordance with such particular information, means including second card holding means constructed and disposed relative to the cards on the second transporting means for positively arresting on a controlled basis at the second periods of time the continuous movement of second particular cards transported on said second transporting means and for providing for a continuous movement of cards past such second holding means at the first periods of time without any arresting of cards by the second holding means, a common receiving means constructed and disposed relative to the transported cards for receiving cards from said first and second transporting means, and control means responsive to the electric signals from said first and second transducer means for selectively operating upon said first and second card holding means in accordance with the particular information on the cards for obtaining a controlled occurrence of the first and second periods of time.

15. In a system for merging information storage cards, the combination of: first and second transporting means each constructed to obtain a continuous movement of the cards, means including first and second card feeding stations each constructed to hold cards and each including retaining means constructed and disposed relative to the cards in the first and second stations to obtain a controlled transfer of cards in succession to respective ones of said first and second transporting means from the first and second stations, means including first transducer means constructed and disposed relative to the cards on the first transporting means for processing particular information on cards transported on said first transporting means and for generating electric signals in accordance with the particular information on the cards, means including first card holding means constructed and disposed relative to the cards on the first transporting means for positively arresting on a controlled basis at first particular periods of time the continuous movement of first particular cards transported on said first transporting means and for providing for the continuous movement of cards past the first holding means at second particular periods of time without any arresting of such cards by the first holding means, means including second transducer means constructed and disposed relative to the cards on the second transporting means for processing particular information on cards transported on said second transporting means and for generating electric signals in accordance with the particular information on the cards, means including second card holding means constructed and disposed relative to the cards on the second transporting means for positively arresting on a controlled basis at the second particular periods of time the continuous movement of second particular cards transported on said second transporting means and for providing for the continuous movement of cards past the second holding means at the first particular periods of time without any arresting of the continuous movement of such cards, a common receiving means constructed and disposed relative to the transported cards for receiving cards from said first and second transporting means, control means responsive to the electric signals from said first and second transducer means for selectively operating upon the first and second card holding means to obtain a controlled arresting of cards by said first and second card holding means in accordance with the particular information on the cards and at the first and second periods of time, and further control means responsive to the electric signals from the first and second transducing means for operating on the first and second retaining means to obtain a release of successive cards from the first card feeding station at the second particular periods of time and from the second card feeding station at the first particular periods of time and to prevent a release of cards from the first card feeding station at the first particular periods of time and from the second card feeding station at the second particular periods of time.

16. In a system for merging information storage cards, the combination of: first and second transporting means each operative on cards to obtain continuous movement of the cards, means including first and second card feeding stations each constructed to hold cards, the first and second card feeding stations respectively including first and second retaining means respectively constructed and respectively disposed relative to the cards in the first and second stations for obtaining a controlled transfer of cards in succession to the respective ones of said first and second transporting means, means including first transducer means constructed and disposed relative to the cards on the first transport means for processing particular information on the cards transported on said first transporting means and for generating electric signals in accordance with the particular information on the cards, means including first card holding means constructed and disposed relative to the cards on the first transporting means for positively arresting on a controlled basis at first particular periods of time the continuous movement of first particular cards transported on said first transporting means and for providing for a continuous movement of cards past the first holding means at second particular periods of time without any arresting of such cards by the first holding means, means including second transducer means constructed and disposed relative to the cards on the second transporting means for processing particular information on the cards transported on said second transporting means and for generating electric signals in accordance with the particular information on the cards, means including second card holding means constructed and disposed relative to the cards on the second transporting means for positively arresting on a controlled basis at the second particular periods of time the continuous movement of the cards transported on said second transporting means and for providing for a continuous movement of cards past the second holding means at the first particular periods of time without any arresting of such cards by the second holding means, a common receiving means constructured and disposed relative to the transported cards for receiving cards from said first and second transporting means, comparison means responsive to the signals from the first and second transducer means for comparing the particular information represented by the signals from said first and second transducer means to produce signals in accordance with such comparison, first means operatively coupled to the comparison means for operating upon the first holding means and the first retaining means to obtain a controlled arresting of cards by said first card holding means at the first particular periods of time and to prevent a transfer of cards from the first card feeding station at the first particular periods of time and to provide for a movement of successive cards past the first holding means at the second particular periods of time and to provide for a release of successive cards from the first card feeding station at the second particular periods of time, and second means operatively coupled to the comparison means for operating upon the second holding means and the second retaining means to obtain a controlled arresting of cards by said second holding means at the second particular periods of time and to prevent a transfer of cards from the second card feeding station at the second particular periods of time and to provide for a movement of successive cards past the second holding means at the first particular periods of time and to provide for a release of successive cards from the second card feeding station at the first particular periods of time.

17. The system set forth in claim 12 in which second control means are responsive to the particular information on the cards transferred to the transport means for operating upon the retaining means in the plurality to prevent any transfer of cards from the input means associated with the particular holding means in the plurality and to provide for a successive transfer of cards from the other input means in the plurality to the transport means.

18. The system set forth in claim 13 in which second control means are responsive to the electric signals from the transducer means for operating on the retaining means in the plurality to prevent a release of cards at each instant by the retaining means associated with the individual holding means in the plurality and to provide for a release of cards by the other retaining means in the plurality.

19. The combination set forth in claim 15 in which additional control means are responsive to the electric signals from the first and second transducing means for operating upon the first and second retaining means to obtain a release of the first particular cards by the first holding means at the second particular periods of time and to obtain a release of the second particular cards by the second holding means at the first particular periods of time.

20. The system set forth in claim 16 in which third means are operatively coupled to the comparison means for operating upon the first and second card holding means to obtain a release of the first particular cards by the first card holding means at the second particular periods of time and to obtain a release of the second particular cards by the second card holding means at the first particular periods of time.

References Cited in the file of this patent

UNITED STATES PATENTS

| | | |
|---|---|---|
| 2,359,670 | Page | Oct. 3, 1944 |
| 2,445,636 | Rubidge et al. | July 20, 1948 |